United States Patent [19]

Miyada

[11] Patent Number: 4,635,962
[45] Date of Patent: Jan. 13, 1987

[54] INERTIAL SAFETY SYSTEM FOR CARS

[76] Inventor: Thomas S. Miyada, P.O. Box 430, Summit, N.J. 07901

[21] Appl. No.: 648,482

[22] Filed: Sep. 7, 1984

[51] Int. Cl.$^4$ .............................................. B60R 21/02
[52] U.S. Cl. ..................................... 280/749; 280/734
[58] Field of Search ....................... 280/749, 748, 734; 296/84 R, 84 K, 84 N, 86, 92

[56] References Cited

U.S. PATENT DOCUMENTS

| | | | |
|---|---|---|---|
| 2,854,281 | 9/1958 | Cassin | 280/749 |
| 3,650,542 | 3/1972 | Shimano et al. | 280/749 |
| 3,692,327 | 9/1972 | Barrick et al. | 280/749 |
| 3,695,629 | 10/1972 | Schlanger | 280/749 |
| 3,721,468 | 3/1973 | Burgess | 280/749 |
| 3,782,756 | 1/1974 | Brown | 280/749 |
| 3,831,975 | 8/1974 | Mednikow | 280/749 |
| 3,837,422 | 9/1974 | Schlanger | 280/749 |
| 4,130,298 | 12/1978 | Shaunnessey | 280/734 |
| 4,171,140 | 10/1979 | Toshihisa | 280/749 |

FOREIGN PATENT DOCUMENTS 1931513 12/1970 Fed. Rep. of Germany ... 298/84 K

Primary Examiner—Richard A. Bertsch

[57] ABSTRACT

This invention relates to an automotive vehicle's windshield expressly designed and purposely made to move forward or open automatically and to get out of the way of the vehicle's passengers who may be thrown against it by virtue of Newton's First Law Of Motion and the inertial property of matter when their speeding vehicle suddenly stops, and not designed or made to move or open manually, robotically, nor with any mechanical device for the purpose of ventilation or external communication.

The principal parts of the embodiment of this invention consist of (a) an automatically opening and forward moving windshield and its supporting bars or arms, hinges, ratchet cylinder (a unique elongated form of ratchet wheel) that permits the windshield to open up speedily in accidents and to close down gradually afterward) and a matching pawl with flexible teeth instead of ones that do not yield; and (b) a protective air net made of strong cordage thickly coated or encased in substance containing air bubbles, such as the foam rubber, and its retaining spool, roller, and pulling cords. Since the pulling cords are securely fastened to the bottom frame of the automatically forward moving and upward opening windshield, when the latter moves forward or swings upward in response to Newton's First Law of motion, the said protective net is pulled down between the passengers and the erstwhile position of the windshield.

5 Claims, 18 Drawing Figures

INERTIAL SAFETY SYSTEM FOR CARS

FIELD OF INVENTION

The present invention relates to a system that prevents the front seat riders of automotive vehicles from being thrown against the windshield when their speeding vehicle suddenly stops. In its broad sense, it may be described as a safety device for cars.

DESCRIPTION OF PRIOR ARTS

Under this heading, I would mention the seat belt, which is one of the most practical safety devices known, but unfortunately its value depends on the cooperation and memory of the riders, which are quite often far from being reliable. As to the air bags, they open with explosive noise, sometimes prematurely or too late.

There are also following prior arts with my unbiased comments accompanying them:

(a) U.S. Pat. No. 2,854,281 (Cassin) has no openable windshield. Mine has.

(b) U.S. Pat. No. 3,692,327 (Barrick) does not have an openable windshield. Mine has.

(c) U.S. Pat. No. 3,650,542 (Shimano) has no openable windshield. No net. Mine has.

(d) U.S. Pat. No. 3,695,629 (Schlanger) has no openable windshield, does not have a unique rubber coated net. Mine has.

(e) U.S. Pat. No. 3,721,468 (Burgiss) has no openable windshield. No net. Mine has.

(f) U.S. Pat. No. 3,782,756 (Brown) has no openable windshield. No net. Mine has.

(g) U.S. Pat. No. 3,831,975 (Medvikow) has no openable windshield and has a very different way of drawing down the safety net. Mine opens (net) in a different way, and he has no openable windshield.

(h) U.S. Pat. No. 4,171,140 (Toshihisa) has no openable windshield. No net. Mine has.

(i) U.S. Pat. No. 2,942,913 (Felts) has no openable windshield and has a different kind of shield to protect the riders. Mine has an openable windshield and has a rubber coated net.

(j) U.S. Pat. No. 2,025,822 (Pryor) has no openable windshield, but has a net that looks like a fish net that catches the head and shoulder. Mine has an openable windshield and a different kind of net.

My invention works automatically and does not depend on human memory, manual dexterity or on chance. The unique windshield opens by natural law comensurate with the sudden stoppage of the car.

SUMMARY

The purpose of this invention is to increase the margin of safety for those who operate automotive vehicles and their passengers, especially the occupants of the front seat, by utilizing the physical law of motion and the inertial property of matter.

In explaining what is patentable, Section 100 of Chapter 10, U.S. Patent Law, defines the term "process" as a "process, art, or method, and including a new use of a known process, machine, manufacture", etc. This invention owes a part of its feature to a method that includes a new use of a known process, machine or manufacture. Many windows, including those installed in houses and on the front or opposite side of the front seat of automotive vehicles, have been made movable, slidable, or openable, at one time or other, to keep out rain, wind and cold, to permit cool air to come in, or for general ventilation purpose. But such movable, openable or slidable windows and windshields were never made knowingly or specifically for the purpose of taking advantage of Newton's First Law of Motion or the inertial property of matter to prevent the front seat riders and others from being thrown against or through the windshield when a speeding vehicle is suddenly stopped in a collision or accident.

If you will hold a small box horizontally on its side with its hinged lid facing forward and hanging over its opening, and move it in a straight line or swing it around you at a slow or moderate speed, and then stop, the lid will remain closed. But if you will move that box in that position very fast or swing it around you at high speed and suddenly stop, the lid will fly open.

If a person looks at his or her car as a box moving on its long side and the car's windshield as the lid of the box, it is easy to understand how a windshield, hinged on its top side and free on its other sides, could fly open when a speeding car suddenly stops. If the upward opened hinged windshield has a ratchet wheel and pawl, it will remain open and the front seat occupants will not be thrown against a glass plate when a speeding car stops suddenly.

In this invention, the top side of the vehicle's front windshield has two long supporting bars, which are called arms in the specification and claims, one on the left side and the other on the right side, each end of each arm securely hinged to the upper frame of the vehicle's front windshield, and the other end of each arm extending horizontally into an elongated cylinder installed just under the front section of the vehicle's roof and running parallel to the longitudinal line of the vehicle, and forming an obtuse angle to the plane of most of the conventionally installed windshields. The other ends of the arms in the said elongated cylinders under the roof are held by springs whose other ends are attached to the midsection of the roof.

Behind the said hinges and running parallel to the upper frame of the windshield is a securely installed ratchet cylinder, a unique device resembling a conventional ratchet wheel, except that it has a long cylinder and flexible steel blades that yield instead of a wheel and rigid teeth that do not yield. Its pawl also has flexible steel blades. Together they permit the upward and forward opened windshield to come down gradually.

Near and slightly below the said ratchet cylinder and pawl and parallel to them is an elongated spool rotatably and securely installed. At or below the level of the vehicle's dashboard is a roller with its left and its right ends rotatably and securely held by the left and the right walls, respectively, of the vehicle.

The said spool is provided with a safety net, which has a leading or pulling cord on its left side and on its right side. Each cord passes under the said roller, goes through an opening in or below the dashboard, and is securely attached to its side of the lower frame of the windshield. When a speeding vehicle suddenly stops in a collision or accident, the said arms move forward, and at the same time the windshield opens by moving forward and upward with considerable force in obedience to Newton's First Law of Motion and by virtue of the inertial property of matter. The said movements of the arms and the windshield instantly cause the said cord to be pulled down and outward, and the safety net comes downward between the occupants of the front seat and the erstwhile location of the windshield. By adding an extra roller and by moving the spool, it is possible to protect the occupants of the back seat too.

This invention is intended to provide a degree of safety and convenience that cannot be delivered by a conventional seat belt and a gas or air bag acting separately. It requires neither unbuckling of belt nor wiggling out from under a pressured air or gas bag when speedy exit from the vehicle is required. Its mechanical simplicity adds very little to the labor and materials required in the manufacture of automotive vehicles, and its safety features would probably have great appeal to both the manufacturers and the users.

DEFINITIONS

The following words and terms are used in this specification and the claims in the sense or senses as defined after them, except where the context clearly indicates otherwise:

Left and right: these relative terms are determined from the standpoint of a person standing at the rear of the vehicle and facing forward. Any object or part on his left side is left, and that on his right side is right, and not the left or right of the object or part itself.

Up and down, top and bottom, when used to describe an object or part of a vehicle means the up or down, and top or bottom of the object or part in its properly assembled position in the vehicle, and not of such object or part unassembled on a bench or floor.

Windshield as used herein includes the combination of the transparent plate and the framework that holds it and detachable from the rest of the vehicle.

Automotive vehicle (or its plural form) is intended to mean any vehicle on land, sea, lake, river or in the air capable of moving usefully with the help of engine, motor, or prime mover, and having a windshield.

Car (or its plural form) is used in this application in the same sense as the term automotive vehicle, and the two terms are intended to be interchangeable.

Hinge or its plural form used in this application is intended to mean a strap hinge, T-hinge, flap hinge, blind hinge, gate hinge, ball-and-socket, or other shaped device that performs a function similar to that of a hinge even though it may be called by other names in vernacular English.

DRAWINGS

FIG. 7A Diagrammatic side view of the windshield and the bellows "pulled" in.

Although the parts of vehicle numbered 5 (the front roof), 4 (the dashboard) and 28 (the hood) are not parts of this invention, they are used herein to guide the readers to ascertain the location of the invented parts.

DETAILED DESCRIPTION OF THE INVENTION

Due to its structural and functional simplicity, the invention shown in the accompanying drawings and described hereinafter may be easily understood by any person skilled in the art related to it.

WINDSHIELD AND ITS ARMS

Figure 1:
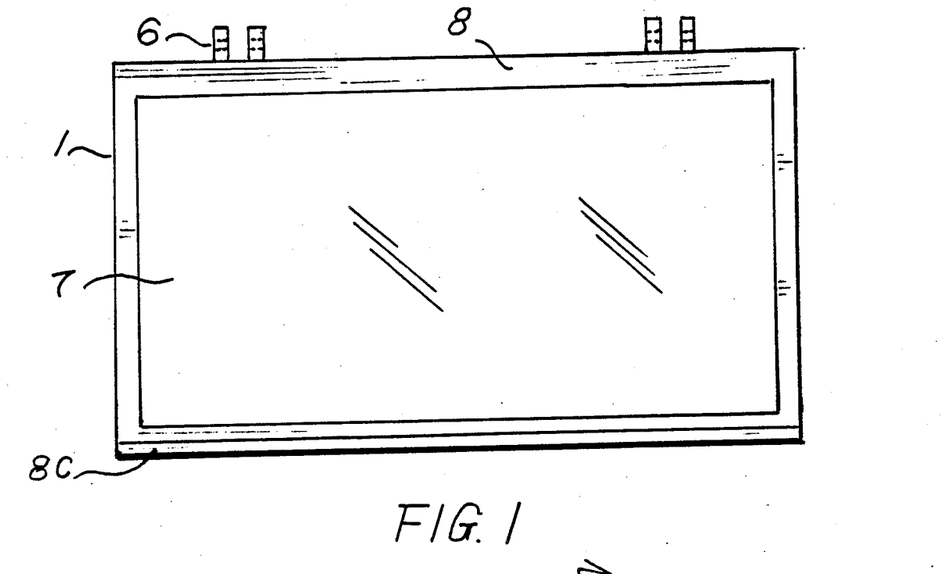
FIG. 1 shows the front view of the front windshield, and the locations where the the hinges must be installed, and the magnetic strip that keeps the free side of the windshield in contact with the vehicle's front framework.

Referring now to the drawings wherein like reference numerals designates like or corresponding parts throughout the several drawings, there is shown in FIG. 1 a frontal elevation view of the windshield (1), which consists of the transparent sheet (7) and the frame (8, 8C), which generally has a rectangular shape or its variation, and its long side usually assembled horizontally and its shorter side positioned vertically, slantingly, or sloping forwardly.

The sides of the windshield, other than the top frame, are equipped with rubber strips to seal off water and cold, and the bottom side is made slightly heavy with rubber pad containing magnetic materials so that that side will remain normally in contact with the frame of the vehicle, but, at the same time, remains free to open. On the upper side of the windshield's top frame, there are at least two strong hinges (6), one on the left and the other on the right, which are attached to a pair of bars called arms.

Figure 2:
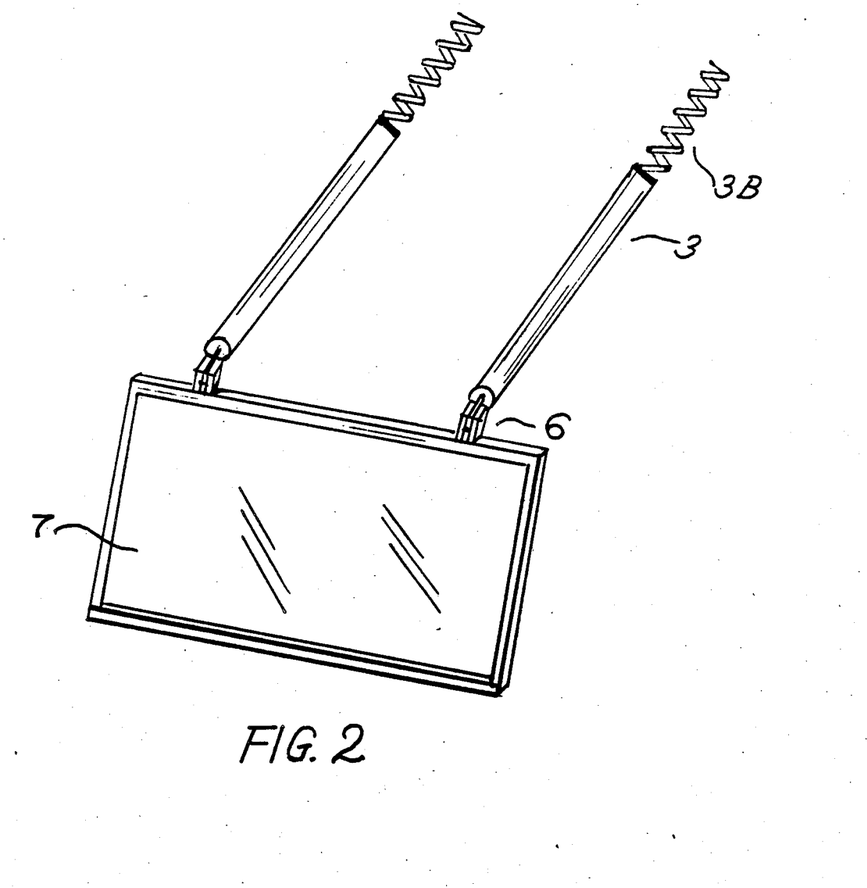
FIG. 2 shows the perspective view of the windshield, its hinged arms, and the springs.
Figure 3:
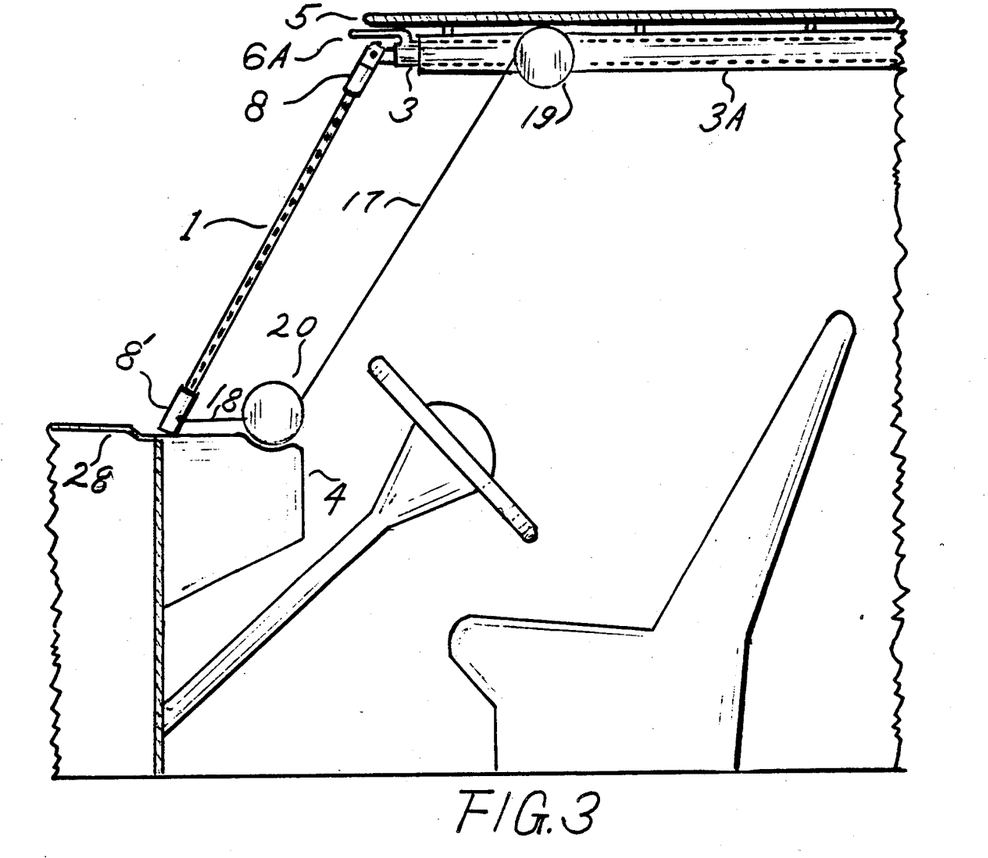
FIG. 3 shows the side view of the windshield, its frame, the hinge holding the windshield to the arm, the tube that holds the arm, the location of the front roof, the spool, the cord that is connected to the net in the spool, the roller, and the location of the windshield's frame to which the cord is attached, as well as the outline of the front seat.
Figure 3A:
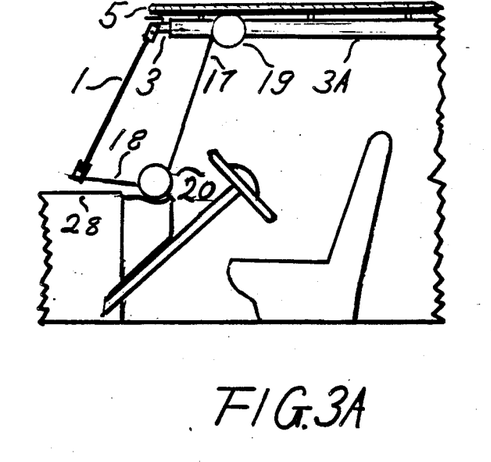
FIG. 3A shows the diagrammatic side view of the windshield in a partly opened condition.
Figure 3B:
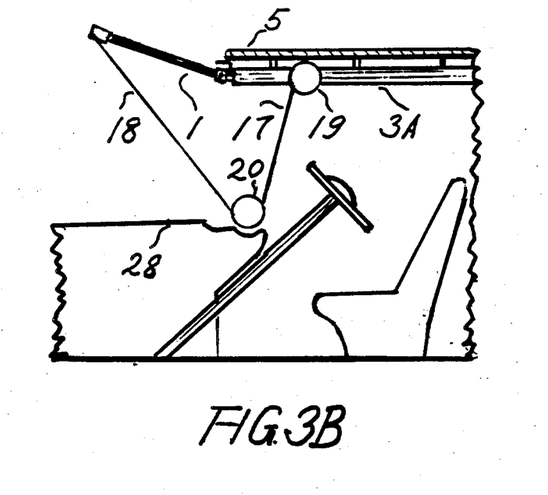
FIG. 3B shows a diagrammatic side view of the windshield fully opened, and the locations of the pulling cord, the side view or location of the protective net in front the front seat, the spool, and the roller.

Each arm (3) is made of strong, rigid material, which may be in the form of a rod or tube, whose one end is flattened and hinged to its corresponding side of the windshield's top frame, and its other end attached to a helical spring whose other end, in turn, securely held to the midsection of the vehicle's roof. Each of the said arms is slidably held in a tube (3A), which is positioned parallel to the longitudinal line of the vehicle and securely attached to the vehicle's roof, preferably under, except if convenience dictates otherwise.

Near the tip of each arm and just above the said hinge is a restrainer (6A) made of strong steel blade, securely attached to the said arm's upper side, and extending well over each hinge. It is quite stiff, but sufficiently flexible to permit the windshield to fly open a short distance above the generally horizontal line of the vehicle's roof (5), but strong enough to return the plane of the windshield to a line more or less parallel to that of the roof before the windshield makes its gradual descent to its normal position opposite of the front seat.

When a speeding vehicle equipped with the said windshield suddenly stops in a collision or other accident, the windshield and its supporting arms, obeying Newton's first law of motion, slide forward away from the front edge of the vehicle's roof (5), and start the movement of the cords and the protective net (17). At the same time, the hinged windshield moves forward and upward (opens) and continues to pull down the cord (18) and the protective net (17) infront the front seat occupants and the erstwhile position of the windshield.

In a sudden stop of a fast moving vehicle, the windshield of this invention could open up with considerable force. Normally, the said arms (3) are held inside the tubes (3A) by springs (3B). Since the said supporting arms and the windshield could move forward and the combined length of the net and the cords is limited, the net becomes stretched and taut enough to prevent the free side of the windshield to turn too far over the roof, and thus with the added help of the said restrainer (6A) the integrity of the transparent shield is more likely to be assured.

Since a certain amount of additional weight could help the inertial property of the windshield, the windshield wiper and its small motor can be mounted on the lower frame of the windshield and the terminals of the electric wires can be a contacting type that matches with the same kind on the vehicle's body.

This windshield was invented solely by myself, and I regard it as an invention that belongs to me exclusively, and shall be so claimed.

PROTECTIVE AIR NET

Figure 4:
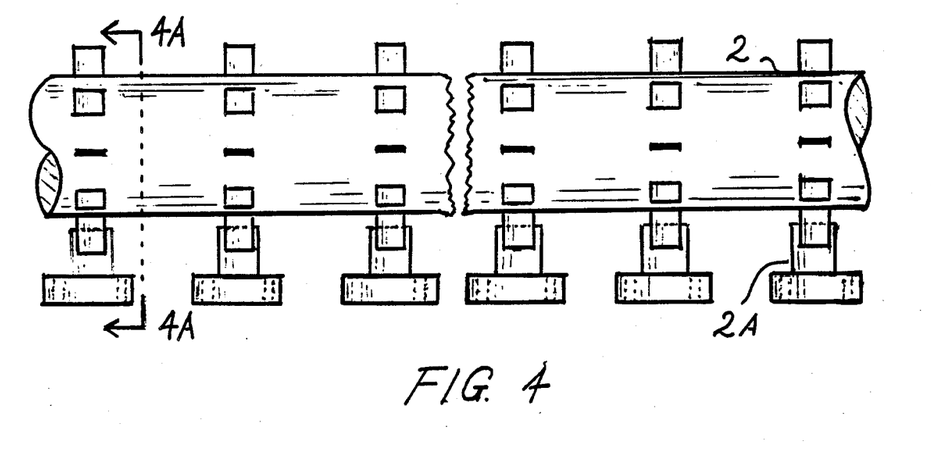
FIGS. 4 and 4A show the different views of the hatchet cylinder and its pawl.
Figures 4A, 5:
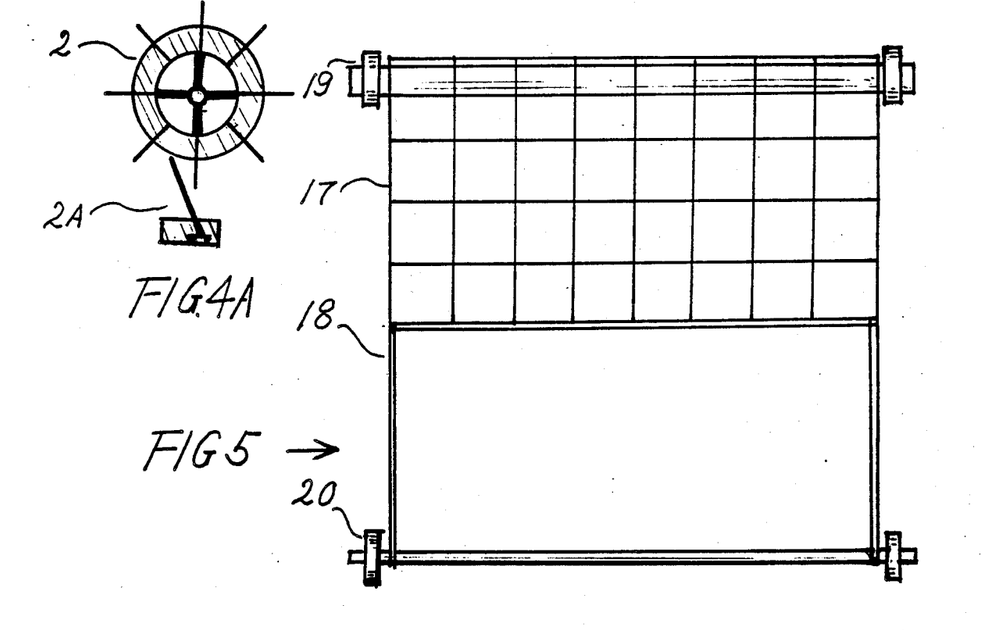
FIG. 5 shows in schematic form the safety protective net partially pulled out of its spool and the cords (pulling) that go around the roller prior to being attached to the lower frame of the windshield.

This invention has a protective air net (FIG. 5) that slides down, and in some models that slides upward, between the passengers and the windshield. It does not come into action by explosion or other violent vibrations. After an accident, a lucky passenger can just walk out of the vehicle without struggling or wiggling from under a pressured or inflated air or gas bag.

Since a vehicle could be moving anywhere between a moderate and suicidal speeds at the time of an accident and under different conditions, not everybody is going to be lucky enough to walk out of the vehicle after a crash. Everything else being equal, a person has a better chance, after an accident to walk out of a vehicle that has a windshield that automatically gets out of his way and a protective net than from a vehicle without those unique features.

The protective air net (17) may have any practical size mesh. In the preferred embodiment, the meshes are quite large, but always smaller than an infant's head. The net is about as wide as the left to right width of the front seat, and is as long as the distance between the vehicle's roof and the bottom of the dashboard (4). It has on its bottom side or the side that requires pulling a pair of strong synthetic cords (18), one near the left side and the other close to the right side. Normally only the cords can be seen close to the side walls of the vehicle, and they do not obstruct the view. The net itself is wound and hidden in a spool described below.

Figure 5A:
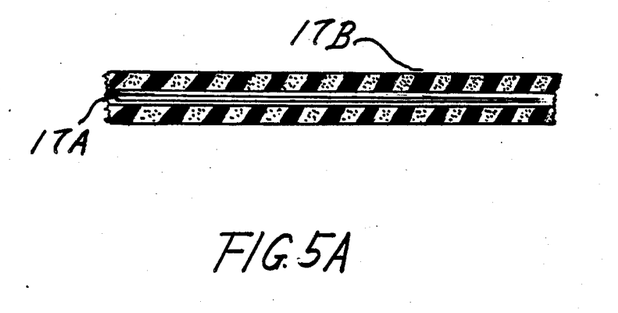
FIG. 5A—a longitudinal section of the string or cordage that makes up the protective net.
Figure 5B:
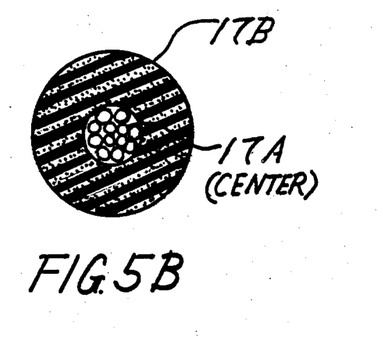
FIG. 5B, the cross sectional view of the strand or cordage that makes up the said air net.

The protective air net itself is made of strong synthetic fibers, (17A), and the cordage is covered or thickly coated with air bubble retaining material, such as the foam rubber, from which is acquired the qualifying word "air". FIG. 5A shows the cross section of the cordage (17A) and the foam rubber coating (17B). FIG. 5A shows a cross section of the cordage.

This air net differs from other nets used to protect front seat riders of vehicles. Since it is coated thickly with air retaining substance, such as the foam rubber, not found on nets used by others in protecting the front seat riders, it stands in a class by itself. I regard it as my exclusive creation and invention and shall be so claimed. The ends of its pulling cords are also unique in the sense that the ends are securely attached to the bottom frame of a movable front windshield.

SPOOL AND ROLLER

A spool (19), having a width about equal to the left-to-right dimension of the front seat, is held securely to the vehicle's front roof, and retaining a roll of the said protective air net (17).

A roller (20), having a width about equal to the said spool (19), and positioned parallel to, away from, and infront of, the said front seat, is securely installed at about the level of the vehicle's dashboard (4), or just below the said dashboard in some models, to provide a smooth passage of the said paired cords (18) on their way to the lower side of the said windshield to be securely fastened thereto. Two holes made between through, or just below, the said dashboard are provided for the passage of the said cords to the windshield.

OPTIONAL EXTENSION OF THE NET

If desired, the protective air net can be extended to guard the occupants of the back seat by (1) moving the said spool of net (19) to, and securely installing on the floor at the back of the front seat but not touching the occupants of the back seat, (2) installing a second roller where the spool was originally located, (3) and placing securely a third roller immediately under the roof at a point above the back of the front seat. Since time is of the essence in any accident, the net should be not only longer but much of its length should be exposed and ready with its forward side already over the second roller and fully exposed between the back of the front seat and the front of the back seat occupants. The net, without obstructing the external scenes, will be in the view of the back seat occupants, but out of sight of the front seat passengers.

HOW THE PARTS ARE ASSEMBLED

The foregoing descriptions of the various parts contained sufficient informations as to guide any person skilled in the art to assemble those parts into a coordinated working unit. A general description of how the parts are put together may be sufficient.

First, the supporting and holding tubes (3A) are positioned and secured under the vehicle's roof. Second, the windshield (1) is securely hinged to the pair of arms (3), which are then inserted into the supporting tubes (3A) and secured. Third, the hatchet cylinder and pawl (FIGS. 4, 4A, 4B) are installed in their positions between the hinges and the front edge of the vehicle's roof. Fourth, only the cords (18) are pulled out of the spool (19) and passed under the roller (20), then passed through openings behind the dashboard, and securely tied or attached to the bottom side of the windshield.

HOW THE SYSTEM WORKS

When a speeding vehicle suddenly stops or caused to be stopped, the human body, due to its inertial property, keeps on moving forward and is thrown against, and sometimes through, the windshield. To prevent such a serious accident, the vehicle's windshield is designed in this invention to respond automatically to Newton's First Law of Motion, and shall move forward and upward away from the occupants of the vehicle's front seat.

At the moment of the sudden stoppage of the vehicle, the supporting arms (3) of the windshield (1) and the windshield move forward, and at the same time the windshield's bottom side moves forward and upward or opens so that the contents of the vehicle, animate or inanimate, will neither be struck by nor strike the windshield. At the same instant, the forward and upward movements of the bottom side of the windshield pulls the paired cords that are attached to the protective air net (17) in the spool (19) and draws the net down between the occupants of the front seat and the erstwhile position of the windshield.

RELATED EMBODIMENTS OF THE SAME INVENTION

Since the basic principle of this invention is to move the shatterable windshield away from the path of the moving human body, especially its head, face, and upper torso, that may be thrown against it by virtue of Newton's First Law of Motion and the inertial property of matter, my various other methods to move the said windshield from its normal position could still be within the principle, scope, or spirit of this invention and application.

RECTANGULAR PLATE AND SHELF VERSION

Instead of a paired arms that hold and support the said windshield, a rectangular plate held in a rectangular recess may be used.

Figure 6:
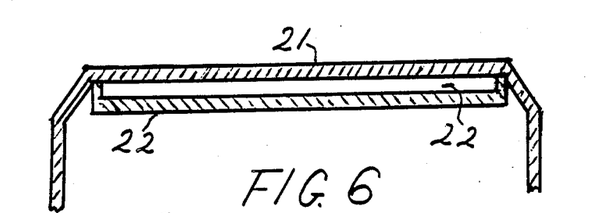
FIG. 6 is the diagrammatic view of the front section of the vehicle's roof where a shelf is made to receive the rectangular plate that holds the windshield.

A rectangular shelf (22) having its long side made about equal to the width of the vehicle's front seat, and a short side that may extend two, three, or more feet, depending upon the size of the vehicle, is securely installed under the front section (21) of the vehicle's roof with its long side positioned parallel to the generally straight edge of the said section (21) of the said roof, its short sides extending rearward horizontally, and its surface plane placed about an inch or more from the underside of said roof and made parallel thereto.

Figure 6A:
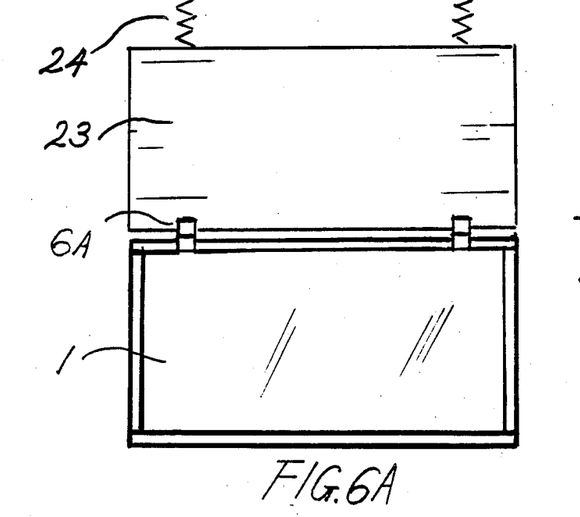
FIG. 6A is a schematic view of the rectangular plate, its springs, its hinges that hold the windshield, and the windshield itself.

The rectangular plate (23) is made of strong, hard, light weight material. Its length and width are made slightly less than those of the said shelf, and provided on one of its long sides with a set of springs (24) that are capable of stretching several feet from fixed positions when pulled, and sufficiently strong to pull the plate backward to its normal position (described below) when the pull is gone, and its other long side provided with hinges (6A) attachable to the windshield (1) of the vehicle.

The rectangular plate (23) is inserted (the long side holding the springs going first) into the rectangular recess (22A) created by the rectagular shelf (22) and the underside of the car's roof. The other end of the springs are securely held or anchored to the back edge of the shelf or the underside of the said roof. The said plate normally will be in the said recess.

The other long side of the plate (23) having the hinges is attached to the upper frame (8) of the movable windshield (1).

Figure 6B:
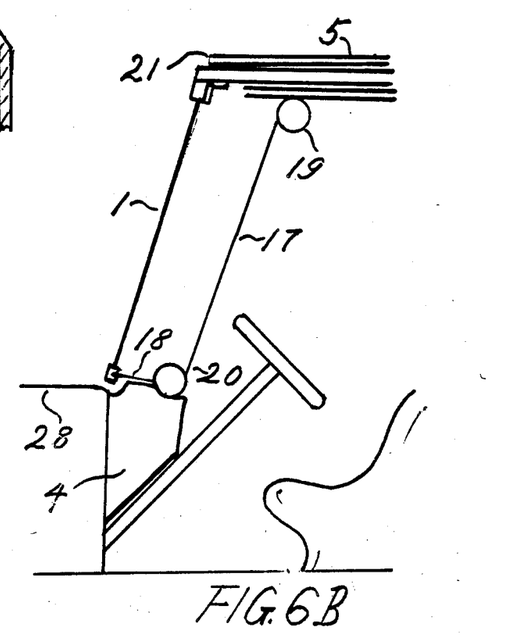
FIG. 6B shows the diagrammatic view of the windshield shown in FIG. 6A in its functional position, the spool, roller, cord, the seat, dashboard as seen from the side.

With the exception of the said arms and tubes, this embodiment has everything the arm version of the invention has. The same kind of spool, roller, pulling cords, net and other parts are used in both versions, and are located in about the same corresponding points and perform the same function in both.

WINDSHIELD ATTACHED TO BELLOWS

Some large cameras have extendable and contractable bellows that permits the lens to move forward, backward, sideward, and upward. Despite the fact that bellows are made of comparatively soft, flexible materials and used very frequently, it is well known that they frequently last longer than the hardware on which they are installed. With this fact in mind, I have also conceived a forward moving windshield attached to a flexible bellows.

Figure 7:
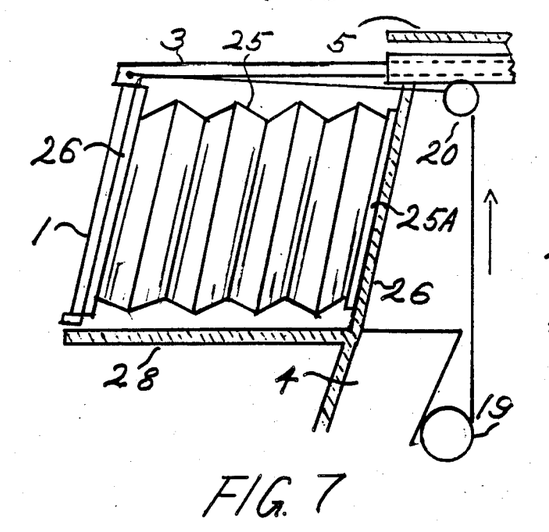
FIG. 7 shows the bellow extended and the windshield moved forward.

In large cameras, the bellows are supported or held in position by a framework that is located below the bellows. In this invention, the bellows that has the windshield in its front opening is held or supported by two arms (3) the same paired arms otherwise used to hold the windshield directly.

Figure 7A:
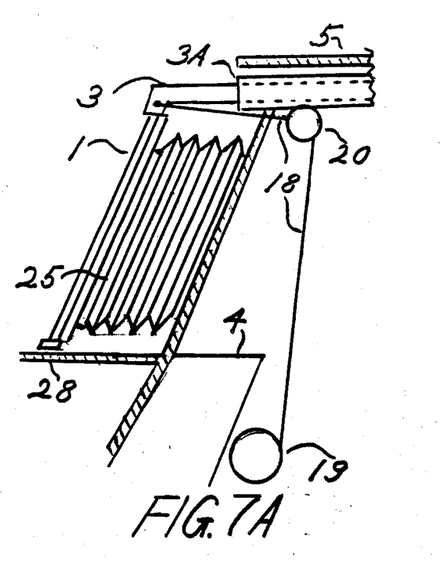

The bellows (25) of this invention are made in the same way and with about the same synthetic materials and processed leathers as are generally used in making bellows for cameras. In this version of the invention, the frame (25A) framing the bellows' (25) rear opening (26) is attached to the vehicle's frame in which the windshield was originally installed, and the frame of its front opening (27) attached to the frame of the movable windshield. In its normal position, the movable windshield will be in contact with the front frame of the vehicle with the folded bellows showing slightly from the edges of the windshield's four sides without obstructing the general external views.

The upper frame of the movable windshield could be hinged to the front section of the bellows so that it can also swing upward, but it is preferred that the said windshield be attached to the front frame of the bellows securely but without the hinges so that it can move forward horizontally away from the front seat passengers when the speeding vehicle suddenly stops.

The bellow type of movable windshield could be of considerable help to some types of cars in rainy weather or in the cold winter months.

In this horizontal moving bellowed windshield, the spool of net (19) is moved from its normal position near the car's roof and securely installed on the floor of the car just below the dashboard, and the roller (20) normally located near the dashboard is moved and securely installed just below the car's roof where the spool was located, and the pulling cords (18) tied or attached to the upper frame of the movable windshield. In this arrangement, when the vehicle suddenly stops, the protective net is pulled upward from the floor level between the erstwhile position of the windshield and the front seat passengers, including the operator.

In some models of cars, the same spool containing the protective net may be installed just below the dashboard or attached to the board itself. Since the net will be rolled inside the spool, and only the pulling cords are seen close to the left and the right sides of the vehicle, manual and other access to the dashboard will not be interfered.

THE LEFT AND RIGHT WINDSHIELD

Figure 8:
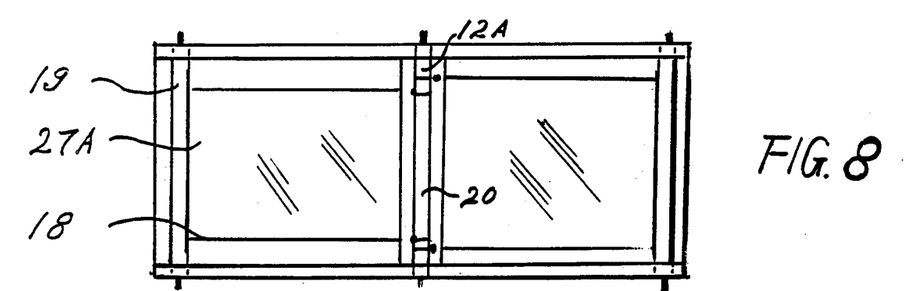
FIG. 8 is the frontal view of the halved or divided windshield.
Figure 9:
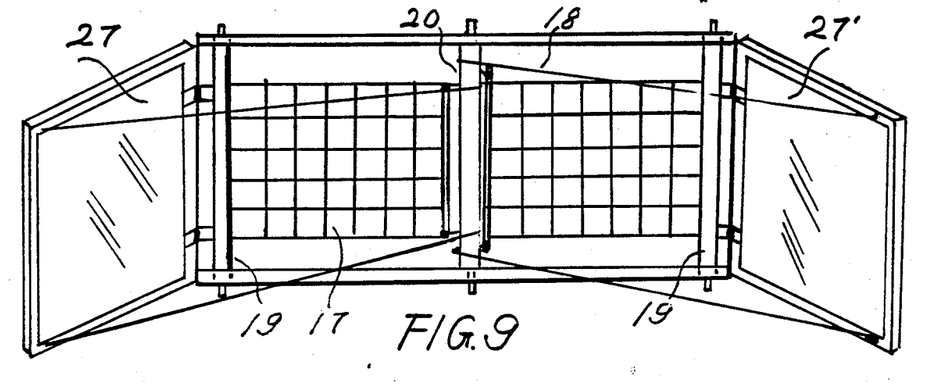
FIG. 9 is a diagrammatic drawing of the left and the right "halved" windshields drawn across the front seat as seen by the occupants of that seat, and the left and the right paired pulling cords and their relative points of attachments.

The windshield may be hinged on its side or sides, and made to swing out or open to either the left or the right side, or it may be divided vertically down the midsection called the demarkation frame (26) so that one-half will swing out to the left, and the other half to the right, thus getting the windshield out of the path of any object, animate or inanimate, that may plunge against it when a speeding car suddenly stops in an accident. Such a windshield is shown in FIGS. 8 and 9. FIG. 9 shows the two halves in an open state.

The left side of its left half (27) is hinged to the left front side of the vehicle, and the right side of its right half hinged to the right front frame or side of the vehicle.

Its working principle is the same as other windshields described hereinabove. It uses the same kind of protective net (17), same kind of spool (19), same kind of pulling cord (18).

In this particular embodiment, there are two separate spools of nets: one spool is securely and vertically installed on the left side of the left windshield, and the other spool installed likewise on the ride side of the right windshield. A pair of left pulling cords go around the demarkation frame and its roller (20) and attach themselves to the left half windshield, and a pair of right pulling cords do likewise and attach themselves to the right half windshield.

When the left half of the windshield swings open to the left and the right half of the windshield swings open to the right, each half of the windshield will pull out the protective net horizontally across infront its side of the front seat.

The demarkation frame located between the two halves holds the roller.

DIRECTLY HINGED WINDSHIELD

Figure 10:
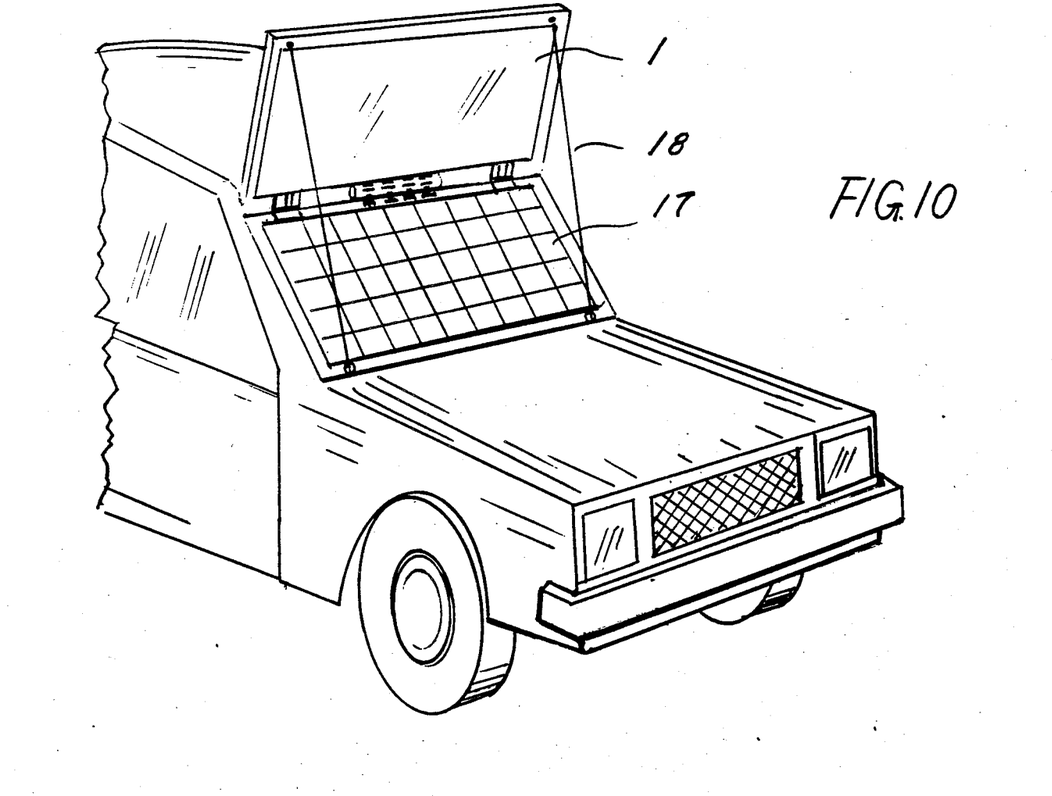
FIG. 10 shows the windshield directly hinged to the front edge of the vehicle's roof and fully opened with the protective safety net fully drawn out in front the front seat, and the position of the pulling cords.

FIG. 10 shows the directly hinged windshield. This embodiment of the same invention is the same as the main embodiment described first hereinabove, except that the top side of the front windshield is hinged directly to the generally horizontal straight front edge of the vehicle's roof or its supporting frame (5) without the supporting arms (3) and tubes (3A) so that that part of the line will read supporting arms (3) and tubes (3A). It has all the other coordinating parts, which performs the same functions in about the same way as those found in other embodiments described hereinabove.

The other coordinating parts are the spool, roller, pulling cords, a unique safety air net thickly coated with air bubble retaining foam rubber. The spool containing the air net is securely located below the the front roof of the vehicle, the roller at the dashboard, either below or on top, the pulling cords connecting the leading side of the safety protective or air net, after going around the roller, are fastened to the bottom left and the bottom right sides of the openable windshield and always ready to be pulled by the windshield.

The windshield directly hinged to the vehicle's front roof, however, has a ratchet cylinder and a row of pawls which its sister embodiments do not have. Between the hinges (6) that hold the upper frame of the windshield (1) and positioned horizontally and running parallel and securely attached to said frame is the said ratchet cylinder (2), a very unique device resembling a ratchet wheel, except that it has a long cylindrical body and flexible steel blades protruding from its side or surface that yield instead of a wheel with rigid teeth that do not yield. A row of pawls (2A), each pawl also having a flexible tooth made of steel blade instead of a fixed rigid tooth or catch is positioned in contact, opposite and parallel, with the said ratchet cylinder and securely attached to the front edge of the vehicle's front roof. Together they perform an important function by permitting the opened windshield to come down gradually after the accident.

The device is used only in the version of the invention where the top frame of the windshield is parallel to and in close proximity at all times with the front edge of the vehicle's roof.

AN EMBODIMENT WITHOUT THE PROTECTIVE NET

As another variation of the embodiments described hereinabove, only the forward movable or openable windshield and its coordinating necessary parts may be used, but without the protective net. In such case there will be less protection unless a seat belt is used.

It is understood that although an exemplary embodiment of the invention has been disclosed hereinabove, other mechanical arrangements are within the realm of possibility, and that the embodiment described hereinabove may be subjected to modifications and substitutions of parts and materials, and yet could still remain within the scope and the declared principle of this invention.

Having described my invention in the foregoing specification and illustrated the same in the accompanying drawings, I hereby claim for the purpose of securing Letters Patent therefor, the followings:

1. An inertial safety system for an automotive vehicle designed to prevent occupants of the vehicle's front seat and others from being thrown against or through the vehicle's front windshield when a fast moving vehicle suddenly stops in a collision or accident by providing a combination of a windshield that moves forwardly or upwardly away from the occupants of the front seat and a protective air net, said invention comprising in combination the following coordinating components:

(a) a forward and upward opening windshield having its upper side or frame hinged to supporting bars called arms, its three other sides unattached to, but in contact with, the front frame of the vehicle's body, and its forward and upward moveability and openability especially designed to take advantage of Newton's First Law of Motion and the inertial property of matters, but not for the purpose of ventilation;

(b) two tubes having open ends showing from under the edge of the front section of the vehicle's roof, one on the left and the other on the right side, and having their long side positioned horizontally and made parallel to the longitudinal line of the vehicle and securely installed immediately under said section of the roof;

(c) two rigid strong bars called arms, one on the left top side and the other on the right top side of the vehicle's windshield, each end of each arm safely hinged to its side of the windshield, the other end extending horizontally and slidably inside each of said paired tubes;

(d) a strong helical spring attached to the end of each of the said arms and to the midsection of the vehicle's roof capable of extending when the arm is pulled outward, and contracting when the outward pull is absent, thus permitting each arm to slide outward with the windshield or to slide backward into its normal position;

(e) a rotatable spool having a width approximately equal to that of the windshield, securely held under the vehicle's front roof and positioned parallel to the upper side of the windshield and containing a roll of net;

(f) a roller having a width about equal to that of the said spool and securely installed at approximately the level of the vehicle's dashboard;

(g) a paired openings, one in the left side and the other in the right side of the vehicle's front wall, communicating with the left and the right, respectively, of the bottom side of the windshield;

(h) protective net made of strong artificial cordage, thickly coated or encased in air bubble retaining foam rubber, and having meshes not larger than an infant's head, a width about equal to that of the said spool and the said roller, and possessing a pair of pulling cords, one on its left side and the other on its right side, which are pulled out of the said spool containing the net, pulled under the said roller, passed through the said openings in the front wall, and then securely attached to the left and the right, respectively, of the windshield's bottom side.

2. An inertial safety system for cars having a windshield not intended for ventilation but design to move forward and upward automatically and to get out of the way of the car's front seat riders who might be thrown against it when their fast moving car suddenly stops in collision or other accident, and a safety net that operates in conjunction with the said windshield and fully independent of the car's operator and riders, said system comprising:

(a) a generally rectangular shelf having its long side made approximately equal to the car's front seat, and positioned parallel to the straight edge of the front section of the car's roof, its short side extending horizontally a short distance towards the rear, its surface plane made parallel to the roof, and securely installed approximately an inch or more below the front section of the said roof;

(b) a rectangular plate made of strong light weight material having its long and short sides slightly less than the corresponding sides of the said shelf, and insertable, with its long side first, into the space between the side shelf and the underside of the front section of the said roof, and having a set of springs on its installed inner long side capable of extending considerably when pulled outward, and strong enough to pull said plate inward when the outward pull is gone, and having on its outer long side a row of conventional hinges that are attached to the upper frame of (c) a windshield consisting of glass plate and its enclosing frame, and having three sides unattached to the car's front but kept in contact thereto by means of magnets and capable of moving forward, upward, and out of the way of the occupants of the car's front seat by virtue of Newton's First Law of Motion and the inertial property of matter when the car suddenly stops;

(d) an elongated spool having the general shape of a conventional spool with a width approximately equal to that of the windshield, positioned horizontally and having its long side parallel to the said windshield and securely installed below the front roof;

(e) a protective air net having the width approximately equal to that of the windshield, made of strong cordage heavily coated with an air bubble retaining foam rubber, wound on said spool and having attached to its leading side (f) a pair of pulling cords, which pass under (g) a roller that has a width approximately equal to that of the spool and positioned horizontally and installed to the wall supporting the windshield, then being securely tied to the (h) bottom frame of the windshield, which in moving forward and upward in a sudden stop of the car pulls the said cords and draws down the protective air net between the passengers and its erstwhile position.

3. An inertial safety system for a car having for its purpose the removal of the shatterable windshield of the car away from the path of human body that may be thrown against it by virtue of Newton's First Law of Motion and the inertial property of matter when a speeding vehicle suddenly stops in an accident, said system comprising:

(a) a windshield bounded on all its sides with opaque frames and unattached to the vehicle's front framework;

(b) two tubes having their open ends showing from under the front edge of the front section of the vehicle's roof, one on the left and the other on the right, and having their long side positioned horizontally and parallel to the longitudinal line of the vehicle and securely installed under the said section of said roof;

(c) two strong rigid bars called arms, each arm having a spring attached to its end and inserted spring side first into each of the said tubes, and the end of each spring attached to a part of the tube and roof;

(d) a bellows made out of flexible leather and synthetic fabrics, having its frame that frames its rear opening attached securely to the vehicle's front framework where a conventional windshield is usually found in a conventional model of automotive vehicles, the frame of its front opening securely attached to the above described windshield's frame, and both the upper frame of the windshield and that of the bellows attached to, and supported by two arms described hereinabove so that when the windshield moves forward it expands forward, and the former moves backward to a normal position it folds up between the former's frame and the vehicle's front framework without obstructing the general view from within the car;

(e) a rotatable spool having a width equal to about the width of the said windshield securely installed on the vehicle's floor below the dashboard, and containing a roll of (f) protective net made of strong artificial fibers coated with an air bubble retaining foam rubber, having a width slightly less then the said spool, a length equal to about the distance between the said spool and the vehicle's roof when fully drawn out of its spool;

(g) a pair of pulling cords attached to the said net's leading or forward side;

(h) a roller having about the same dimensions as the said spool, securely installed under the front section of the vehicle's roof, and having the said pulling cords passing over it on their way to the movable windshield attached to bellows;

and the ends of the said pulling cords securely attached to the top frame of the said windshield so that when the latter suddenly moves forward at the instant the speeding vehicle stops, the protective net will be pulled upward between the front seat riders and the erstwhile position of the windshield.

4. An inertial safety system for cars having a paired windshield not intended for ventilation, but designed to get out of the way of the car's front seat riders who might be thrown against it when speeding vehicle suddenly stops in an accident and a protective safety net that functions automatically to shield the front seat riders, said system comprising in combination (a) windshield divided into two parts, the right and the left, with a straight demarcation frame running vertically from the top midsection to the lower midsection;

(b) the left side frame of the left half of the windshield hinged directly to the left front side frame of the vehicle, and the right side frame of the right half of the windshield hinged directly to the right front side or frame of the vehicle, the former capable of opening to the left and the latter opening to the right;

(c) two spools, each containing a safety net positioned vertically and each securely installed at the vehicle's left front side and at the vehicle's right front side (d) a pair of pulling cords securely attached to each safety net, and passed around rollers at the demarcation frame of the halved windshield, and then secured fastened to the free corners of each halved windshield, such that when the halved windshields fly open in their respective direction, each paired cord shall pull the said net horizontally from its side common demarcation frame, thus protecting the riders.

5. An invention for automotive vehicles, a windshield designed to open or move forward automatically in accordance to Newton's First Law of Motion and the inertial property of matters, and not for ventilation, and to prevent occupants of a vehicle's front seat and others from being thrown against or through a vehicle's front windshield when a speeding vehicle suddenly stops in an accident, the said invention comprising in combination, the following:

(a) a forward or upward openable windshield having its upper frame or part hinged directly to the front edge of the front part of the vehicle's roof, and its three other sides unattached, but in contact, with the front frame of the vehicle's body;

(b) a rotatable spool having a width about equal to that of the windshield positioned parallel to the upper side of the windshield, securely held under the vehicle's front roof near the latter's front edge and containing a roll of protective net;

(c) a roller having a width equal to that of the spool, positioned parallel to the windshield and securely installed to contact or at the level of the vehicle's dashboard;

(d) a pair of openings, one at the left side, and the other on the right side of the vehicle's front wall communication with the left and the right bottom sides of the windshield;

(e) a protective net made of artificial fibers, each fiber thickly coated or encased in an air bubble retaining foam rubber, and having meshes about the size of, but not larger than, an infant's head, a width slightly less than the said spool and roller, a length equal to the distance between the said spool and roller, and possessing a pair of pulling cords, one on its left end and the other on its right end, which are pulled out of the said spool, pulled under the said roller, passed through the said openings in the front wall of the vehicle, and then securely attached to the left and the right, respectively, of the windshield's bottom side, and thus making it possible for the protective air net to be pulled down between the occupants of the front seat and the erstwhile position of the windshield in response to Newton's First Law of Motion and inertial property of matter when a speeding vehicle suddenly stops (f) device having a long cylinder and flexible, yieldable steel blades protruding from its surface said cylinder positioned horizontally to and parallel with and securely attached to the upper frame of the said windshield between the latter's hinges, and a row of pawls, each pawl having flexible teeth of steel blades and positioned in contact with, opposite of and parallel with the ratchet cylinder, and securely attached to the front edge of the vehicle's front roof, said cylinder and pawls functioning together to help the opened windshield to come down or close gradually.

* * * * *